United States Patent
Murty et al.

(10) Patent No.: US 7,571,040 B2
(45) Date of Patent: Aug. 4, 2009

(54) METHOD AND APPARATUS FOR CONTROLLING A MAGNETO-RHEOLOGICAL POWER STEERING COUPLING

(75) Inventors: Balarama V. Murty, West Bloomfield, MI (US); Chandra S. Namuduri, Troy, MI (US); Kenneth J. Shoemaker, Highland, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 542 days.

(21) Appl. No.: 11/352,578

(22) Filed: Feb. 10, 2006

(65) Prior Publication Data

US 2006/0259221 A1 Nov. 16, 2006

Related U.S. Application Data

(60) Provisional application No. 60/680,206, filed on May 12, 2005.

(51) Int. Cl.
*A01B 69/00* (2006.01)
*B62D 5/04* (2006.01)
(52) U.S. Cl. .................. 701/41; 701/42; 701/46; 701/47; 180/415; 180/417; 180/442; 180/443; 180/444

(58) Field of Classification Search ............ 73/117.02; 74/388 PS, 390–403, 484 R–490; 116/31; 137/352; 701/41, 209–211, 213, 201, 202; 180/240, 6.2–6.7, 9.38, 218–231, 233–267, 180/78, 400–449; 340/995.23, 995.19, 995.21, 340/995.2, 995.25; 342/458, 561
See application file for complete search history.

(56) References Cited

U.S. PATENT DOCUMENTS

| | | | | |
|---|---|---|---|---|
| 4,457,390 A | * | 7/1984 | Abe et al. | 180/422 |
| 5,504,679 A | * | 4/1996 | Wada et al. | 701/41 |
| 5,829,547 A | | 11/1998 | Fujii et al. | 180/422 |
| 6,157,095 A | * | 12/2000 | Namuduri | 307/125 |
| 6,290,043 B1 | | 9/2001 | Ginder et al. | 192/21.5 |
| 6,318,531 B1 | | 11/2001 | Usoro et al. | 192/21.5 |
| 6,920,753 B2 | | 7/2005 | Namuduri | 60/435 |
| 2003/0146041 A1 | * | 8/2003 | Kanda | 180/446 |

* cited by examiner

*Primary Examiner*—Khoi Tran
*Assistant Examiner*—Bhavesh Amin

(57) ABSTRACT

A method of controlling a magneto-rheological power steering coupling is provided. The method is to be employed by a controller and is initiated upon engine start-up. The method includes initializing calibration parameters and reading a plurality of input values. Subsequently, a hand wheel angle rate value is calculated from one of said plurality of input values. A pump speed command value is calculated as a function of at least the hand wheel angle rate value. A pump speed error value is then calculated, and a proportional-integral-derivative calculation is performed acting on the pump speed error value to determine a pulse width modulation duty cycle value. The duty cycle value is then output to a power driver to provide a control signal to the magneto-rheological power steering coupling. Also provided is control system and apparatus operable to perform the functions described hereinabove.

11 Claims, 3 Drawing Sheets

METHOD AND APPARATUS FOR CONTROLLING A MAGNETO-RHEOLOGICAL POWER STEERING COUPLING

CROSS-REFERENCE TO RELATED APPLICATIONS

This application claims the benefit of U.S. Provisional Application 60/680,206, filed May 12, 2005, which is hereby incorporated by reference in its entirety.

TECHNICAL FIELD

The present invention relates to a method of controlling a magneto-rheological power steering coupling system.

BACKGROUND OF THE INVENTION

It is known to provide a power steering system for a vehicle, such as a motor vehicle, to assist a driver in steering the motor vehicle. Typically, the power steering system is of a hydraulic type. The hydraulic power steering system employs an engine driven hydraulic power steering pump for generating pressurized fluid, which is subsequently communicated to a hydraulic steering gear of the motor vehicle. Since the power steering pump is driven directly by the engine using a belt or other method, its rotational speed is determined by that of the engine and it operates continuously as long as the engine is running, resulting in continuous circulation of the hydraulic fluid through the steering gear. In addition, the power steering pump must provide the required flow and pressure for the worst case engine speed, which is typically near idle engine speed, under static steering conditions.

More recently, electro-hydraulic power steering systems have been used to provide an on-demand hydraulic pressure using an electric motor to drive the hydraulic power steering pump. An example of such an electro-hydraulic power steering system incorporates a hydraulic power steering pump driven by a brushless direct current electric motor controlled by a pulse width modulated inverter. Also in use are electrically driven steering systems, which are operable to assist in steering the vehicle using purely electro-mechanical system components.

Other devices, such as the one described in commonly assigned U.S. Pat. No. 6,920,753, provide a means to directly control the speed of the power steering pump by using a magneto-rheological clutch or coupling (MRC) disposed between the accessory drive belt and the power steering pump. The MRC provides a continuously variable speed by controlling the torque transmitted to the power steering pump. The MRC can be part of the pump assembly, a separate unit, an integral part of the pump pulley, etc. The viscosity of the magneto-rheological fluid, or MRF, contained within the MRC can be controlled by exposing the MRF to a magnetic field. As the viscosity of the MRF is increased, the torque transfer through the fluid is increased. Since a conventional electronic control unit (ECU) can control the intensity of the magnetic field, the speed of the power steering pump may be varied independent of engine speed.

SUMMARY OF THE INVENTION

Accordingly, provided is a method of controlling a magneto-rheological power steering coupling. The method includes receiving a plurality of sensor input values and computing a hand wheel angle rate value from at least one of the plurality of input values. Subsequently, a pump speed command value is generated as a function of at least the hand wheel angle rate value. The method further includes determining a pump speed error value and computing a duty cycle value using a non-linear proportional-integral-derivative equation based on the pump speed error value. The magneto-rheological power steering coupling is then controlled based on the duty cycle value.

Also provided is a control system for controlling a magneto-rheological hydraulic power steering pump assembly having a magneto-rheological fluid coupling. The control system includes an electronic controller having an electronic control unit and a power driver. The power driver is in electrical communication with the magneto-rheological fluid coupling. Also provided is an electrical power source. The electrical power source is in electrical communication with the power driver to provide power to the power driver. The electronic control unit is in electrical communication with the power driver and operates to control the output of the power driver to control the magneto-rheological fluid coupling.

Yet another aspect of the present invention provides a magneto-rheological power steering control system having magneto-rheological hydraulic power steering pump assembly with a magneto-rheological fluid coupling. Also provided is an electronic controller having an electronic control unit and a power driver. The electronic control unit includes a central processing unit, an algorithm memory, and a sensor interface. A communication bus electrically connects the central processing unit, the sensor interface, and the power driver. The algorithm memory includes at least one look-up table and at least one algorithm, the algorithm memory is in electrical communication with the central processing unit. The sensor interface operates to receive at least one input value and to communicate the at least one input value to the communication bus. The central processing unit communicates with the sensor interface and the algorithm memory to compute a duty cycle value. The duty cycle value is communicated to the power driver to control the magneto-rheological fluid coupling.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
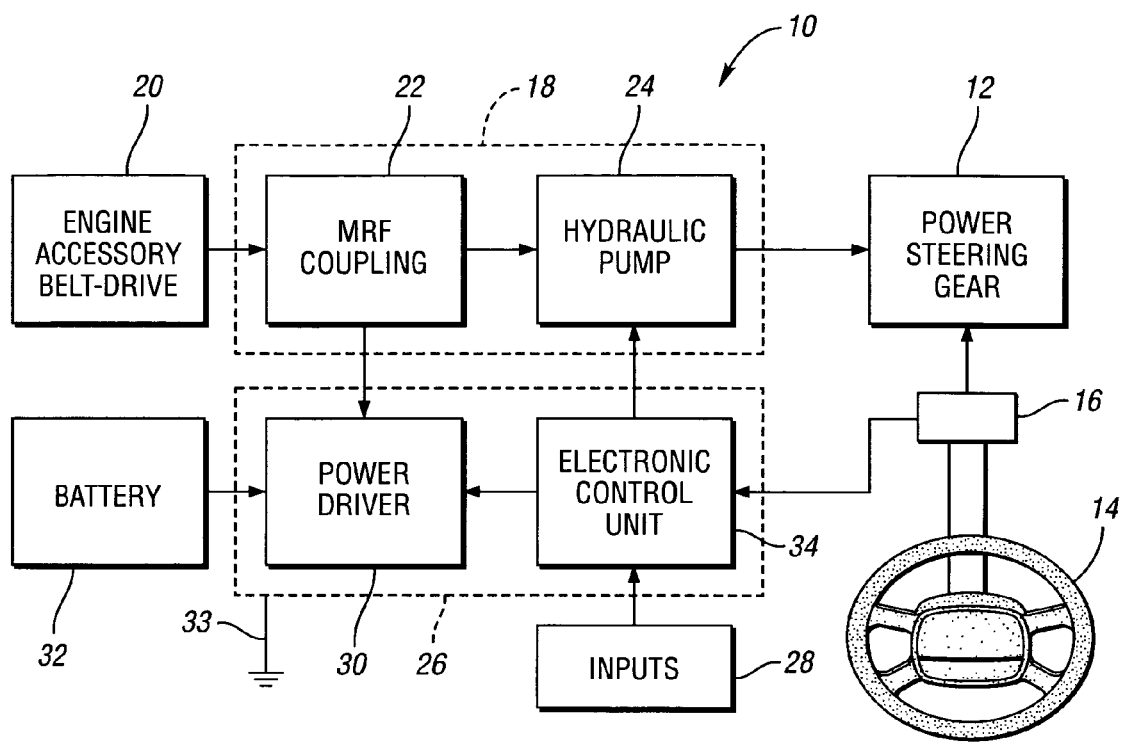
FIG. 1 is a schematic diagrammatic illustration of a magneto-rheological hydraulic power steering system.

Referring now to the figures wherein like characters represent similar components, there is shown in FIG. 1 a magneto-rheological hydraulic power steering system 10 for a vehicle. The magneto-rheological hydraulic power steering system 10 includes a steering actuator, such as a steering gear 12 and a hand wheel or steering wheel 14 operatively connected to the steering gear 12. The magneto-rheological hydraulic power steering system 10 also includes a steering wheel sensor 16 operatively connected to the steering wheel 14 to sense hand wheel angle and/or hand wheel torque exerted on the steering wheel 14 by the operator.

The magneto-rheological hydraulic power steering system 10 further includes a magneto-rheological hydraulic power steering pump assembly, indicated at 18, operatively connected to the power steering gear 12 and driven by an output member of an engine (not shown) via an accessory belt drive 20. The magneto-rheological hydraulic power steering pump assembly 18 includes a magneto-rheological fluid clutch or coupling 22 and a hydraulic pump 24. It should be apparent to those skilled in the art that the pump 24 operates to provide a source of pressurized fluid to the steering gear 12 to assist in steering the vehicle. The magneto-rheological fluid coupling 22 is employed to directly and variably control the speed of the pump 24 by controlling the torque transmitted from the belt drive 20 to the pump 24. It should be appreciated that the magneto-rheological fluid coupling 22 may be part of the pump assembly, pulley, or a separate unit. Magneto-rheological fluid couplings suitable for use with the magneto-rheological hydraulic power steering system 10 are described in commonly assigned, U.S. Patent Application No. 2005/0188690 entitled "Magneto-Rheological Hydraulic Power Steering System," Namuduri, et al, published Sep. 1, 2005, which is hereby incorporated by reference in its entirety.

The magneto-rheological hydraulic power steering system 10 includes an electronic controller 26 in electrical communication with the steering wheel sensor 16 and operable to receive and process a plurality of inputs 28 from sensors throughout the vehicle. Additionally, the controller 26 includes an output power driver 30, such as a pulse width modulation (PWM) device. The pulse width modulation device provides a pulsatile waveform that has an effective voltage lower than the input voltage. The output power driver 30 is in electrical communication with a coil 31, shown in FIG. 2, of the magneto-rheological fluid coupling 22 and is operable to provide a control current to the coil 31. The output power driver 30 and the controller 26 are in electrical communication with an electrical power source 32, such as a battery, and a ground 33. The controller 26 further includes an electronic control unit 34, or ECU.

Figure 2:
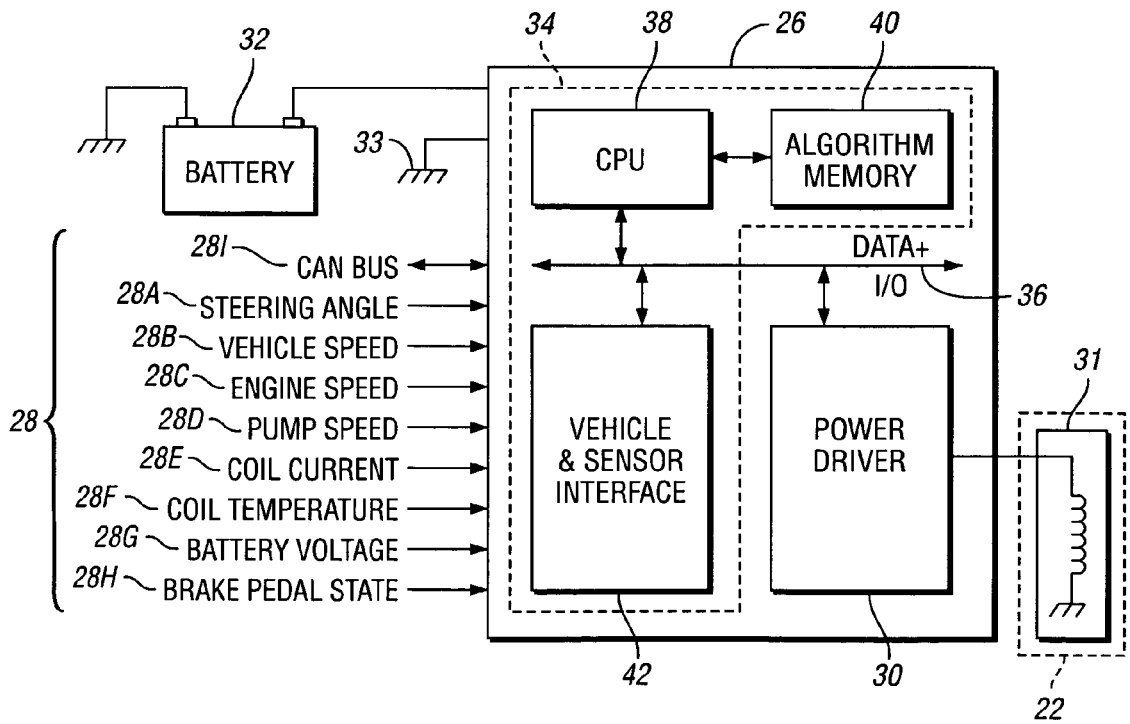
FIG. 2 is a schematic diagrammatic illustration of the magneto-rheological hydraulic power steering system electronic controller of the magneto-rheological hydraulic power steering system shown in FIG. 1.

Shown in FIG. 2 is a detailed illustration of the electronic controller 26. The electronic controller 26 includes a communication bus 36 interconnecting a central processing unit 38 (CPU), a vehicle and sensor interface 42, and the output power driver 30. An algorithm memory 40 is also provided within the controller 26. The controller 26 receives various sensor inputs 28 in analog and/or digital form. A steering wheel angle input 28A may be obtained from the steering wheel sensor 16, which is operable to provide incremental angle values in the form of a two phase pulse train (e.g. for every one degree of angular rotation of the steering wheel 14) with an index pulse to indicate the on-center or near zero position and/or an analog voltage proportional to the absolute angle. A vehicle speed input 28B may be determined from a combination of one or more vehicle wheel speed sensors, not shown. An engine speed input 28C may be determined through a crank angle rotation sensor, not shown. Additional inputs may include a power steering pump speed input 28D, a magneto-rheological fluid coupling coil current input 28E, a magneto-rheological fluid coupling coil temperature input 28F, and a battery voltage 28G. A brake pedal state input 28H may also be included. The inputs 28A through 28H may be input to the controller 26 as discrete inputs or via a vehicle communication bus 28I such as a controller area network (CAN) from other subsystems. Those skilled in the art may recognize additional inputs other than those herein described that may be suitable for use with the present invention.

The interface 42 provides signal conditioning and/or conversion of the inputs 28 to a suitable digital form for use with the CPU 38 via the communication bus 36. The algorithm memory 40 contains algorithms and look-up tables to be used by the CPU 38 in conjunction with the information supplied by the interface 42 to send a command signal to the output power driver 30 via the communication bus 36. The command signal will direct the output power driver 30 to supply a current to the coil 31 thereby controlling the rotational speed of the pump 24.

Figure 3:
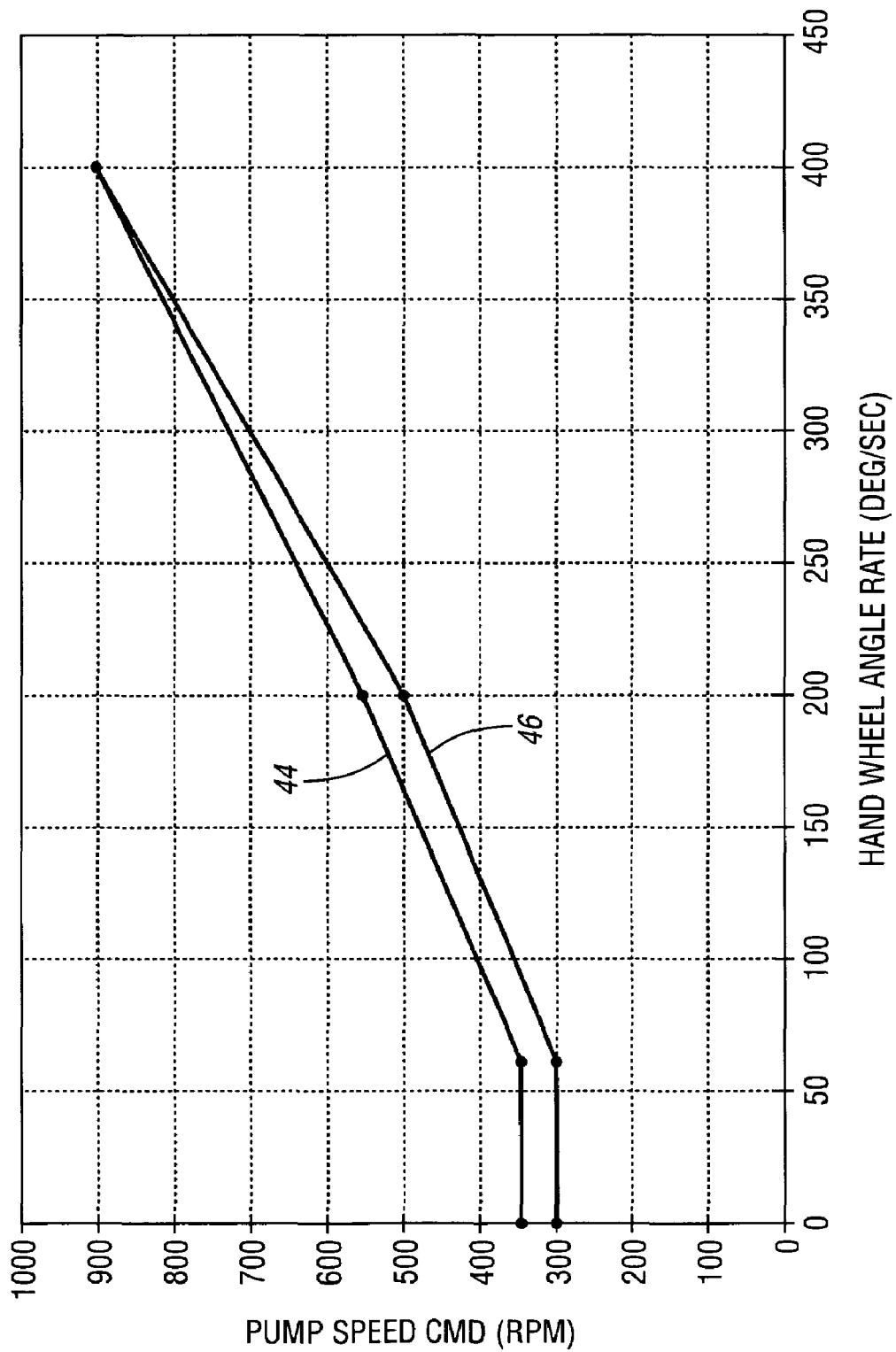
FIG. 3 is a calibration look-up table (LUT) illustrating representative curves depicting commanded power steering pump speed versus hand wheel angle rate, to be used in conjunction with the electronic controller shown in FIG. 2.

An exemplary look-up table (LUT), shown in FIG. 3, illustrates commanded speed of the pump 24 as a function of hand wheel angle rate and vehicle speed. The information contained within the LUT is stored in the algorithm memory, shown at 40 in FIG. 2, for access by the CPU 38. A first exemplary curve 44 illustrates the desired power steering pump operation for vehicle speeds less than or equal to 10 miles per hour, while a second exemplary curve 46 illustrates the desired power steering pump operation for vehicle speeds greater than 10 miles per hour. Those skilled in the art will recognize that 10 miles per hour point was chosen for the purpose of discussion only and may be any predetermined speed depending on the application of the present invention. At low hand wheel angle rates, the curve 46 commands a lower pump speed than that of curve 44 in order to maximize fuel economy. During parking maneuvers, with the engine operating at idle speed conditions with low vehicle speeds and high hand wheel angle rate, the commanded pump speed is set lower than the engine speed multiplied by the pulley ratio. The maximum commanded pump speed is chosen to correspond to the value beyond which the internal flow bypass valve is activated, shown as 900 RPM in FIG. 3. The commanded pump speed as a function of hand wheel angle, hand wheel angle rate, vehicle speed, and engine speed may be tuned for a specific vehicle application to provide the desired steering feel. Adjustments to the commanded pump speed may be made as a function of temperature of the coil 31. Those skilled in the art will recognize that there may be more or fewer command curves than those shown in FIG. 3 such as, for example, commanded speed of the pump 24 as a function of hand wheel angle. Additionally commanded speed of the pump 24 as a function of brake pedal state, traditionally represented as a binary value, may also be stored within the algorithm memory 40. Additionally, those skilled in the art will recognize that the curves may be of any shape and that the LUT may be a three-dimensional or multi-dimensional LUT.

Figure 4:
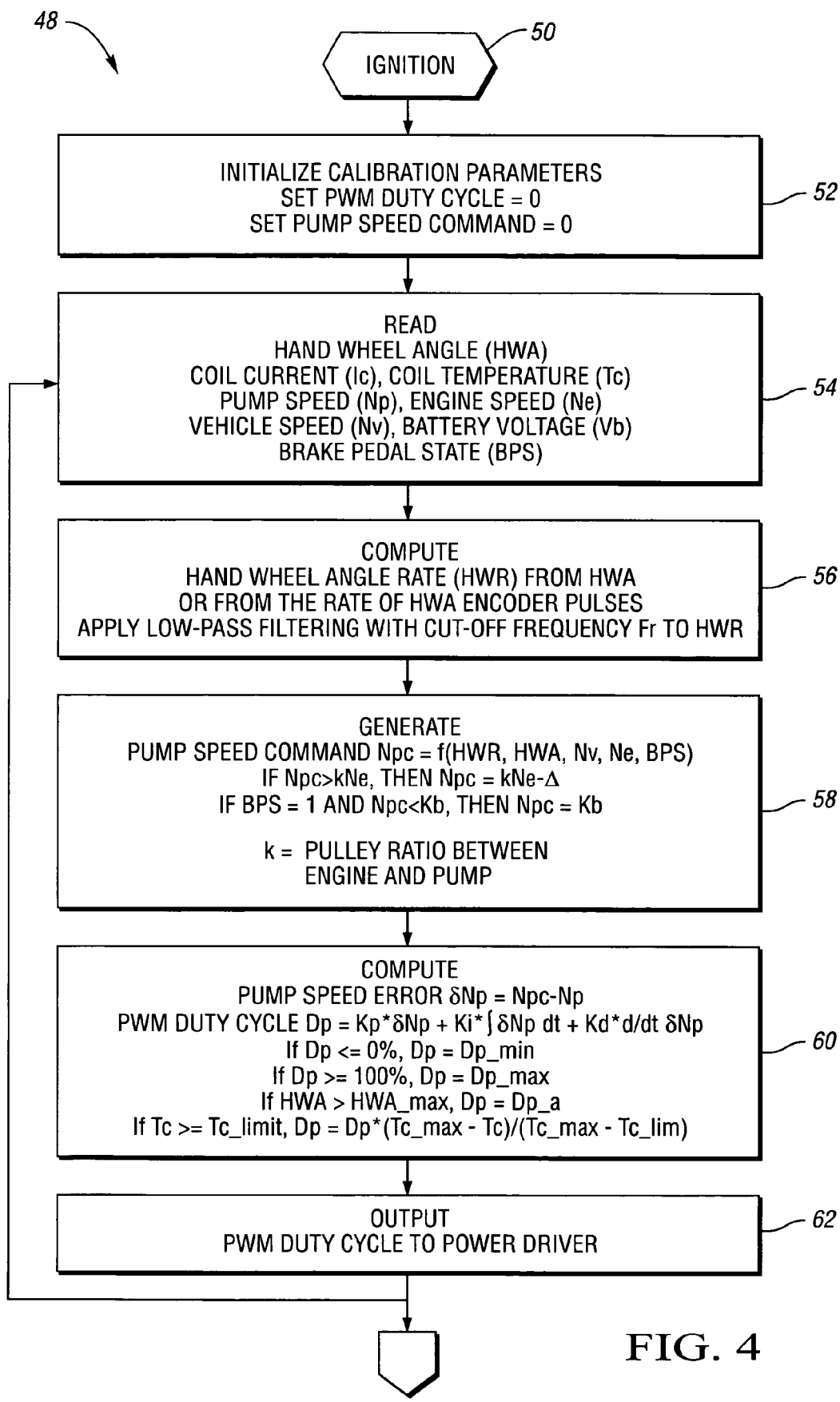
FIG. 4 is a diagrammatic representation, in flow chart format, of a method of controlling the magneto-rheological hydraulic power steering system, shown in FIG. 1, illustrating steps to control power steering pump speed, in accordance with the present invention.

FIG. 4 depicts a method 48 of controlling the pump assembly 18 of FIG. 1. More precisely, FIG. 4 shows a flow chart representing an exemplary algorithm to be employed by the controller 26, shown in FIGS. 1 and 2. The method 48 is initiated upon vehicle ignition at step 50.

At step 52, the controller will initialize calibration parameters. During this step, the output value of the power driver 30 or pulse width modulation (PWM) duty cycle is set to zero and the pump speed command value is set to zero.

At step 54, the controller will read values of various sensor inputs 28 such as hand wheel angle (HWA), coil current (Ic), coil temperature (Tc), pump speed (Np), engine speed (Ne), vehicle speed (Nv), battery voltage (Vb), and brake pedal state (BPS).

At step 56, the controller will compute a value for hand wheel angle rate from the value for hand wheel angle read at step 54 or from the rate of hand wheel angle encoder pulses.

A low pass filter with a cut-off frequency is subsequently applied to the hand wheel angle rate at step 56.

At step 58, the controller will generate a pump speed command value as a function of hand wheel angle, hand wheel angle rate, vehicle speed, engine speed, and brake pedal state. The step 58 will employ an LUT, such as that shown in FIG. 3, to determine the pump speed command value. If the pump speed command value is greater than the engine speed value multiplied by a pulley ratio value (the ratio between the engine pulley and the pump pulley), then the pump speed command value will be set to the engine speed value multiplied by the pulley ratio value with a delta, or pump speed offset, value subtracted therefrom. Alternately, if the brake pedal state value is true or one, and the commanded pump speed is less that a constant, Kb, then the commanded pump speed is set equal to Kb. In the preferred embodiment, the value for Kb is equal to 450 RPM. However, those skilled in the art will recognize that other suitable vales for Kb may be chosen dependent on the application.

At step 60, the controller will compute a pump speed error value and a PWM duty cycle value. The pump speed error is determined by subtracting the measured pump speed value from the pump speed command value. The PWM duty cycle value is determined by a non-linear proportional-integral-derivative (P-I-D) controller acting on the pump speed error and is consistent with the following equation:

$$Dp = Kp \cdot \delta Np + Ki \cdot \int \delta Np \, dt + Kd \cdot d/dt \delta Np$$

Where:
Dp=PWM duty cycle
Kp, Ki, and Kd=Controller gain
δNp=Pump speed error

The use and operation of the P-I-D controllers are understood by those skilled in the art. If the calculated PWM duty cycle value is less than or equal to 0%, the PWM duty cycle will be set to a predetermined minimum value. Alternately, if the calculated PWM duty cycle is greater than or equal to 100%, the PWM duty cycle will be set to a predetermined maximum value. If the hand wheel angle value is greater than a predetermined maximum value, the PWM duty cycle will be limited to a calibrated value to prevent heating of the pump 24. Step 60 also contains a coil over-temperature protection to ensure that the temperature of coil 31 remains within an acceptable limit. If the coil temperature is greater than or equal to a maximum limit, dictated by the coil design, the PWM duty cycle will be reduced using the following equation:

$$Dp = Dp \cdot \frac{(Tc\_max - Tc)}{(Tc\_max - Tc\_lim)}$$

Where:
Dp=PWM duty cycle
Tc=Coil temperature
Tc_max=Maximum allowable coil temperature
Tc_lim=Limiting coil temperature beyond which point the PWM duty cycle will be reduced At step 62, the controller will output the PWM duty cycle value previously calculated at step 60 to the output current driver 30, which will subsequently provide a current to the coil 31. During operation, the coil 31 is selectively and variably energized with electrical current from the current driver 30, thereby creating a magnetic field that passes through the magneto-rheological fluid, or MRF, contained within the magneto-rheological fluid coupling 22. When the MRF is exposed to the magnetic field, the magnetic particles therein will align with the field and increase the viscosity and therefore the strength of the MRF resulting in torque transfer from the magneto-rheological fluid coupling 22 to the pump 24. The torque transfer ability or characteristic of the MRF will vary with the intensity of the magnetic field. At the conclusion of step 62, the algorithm 48 will run again with updated values of various sensor inputs 28 being read in at step 54.

While the best modes for carrying out the invention have been described in detail, those familiar with the art to which this invention relates will recognize various alternative designs and embodiments for practicing the invention within the scope of the appended claims.

The invention claimed is:

1. A method of controlling a magneto-rheological power steering coupling comprising:
   receiving a plurality of sensor input values;
   computing a hand wheel angle rate value from at least one of said plurality of input values;
   generating a pump speed command value as a function of at least said hand wheel angle rate value;
   determining a pump speed error value;
   computing a duty cycle value using a non-linear proportional-integral-derivative equation based on said pump speed error value; and
   controlling the magneto-rheological power steering coupling based on said duty cycle value.

2. The method of controlling a magneto-rheological power steering coupling of claim 1, wherein said plurality of sensor input values include at least one of a hand wheel angle value, a coil current value, a coil temperature value, a pump speed value, an engine speed value, a vehicle speed value, a battery voltage value, and a brake pedal state value.

3. The method of controlling a magneto-rheological power steering coupling of claim 2, wherein said computing a hand wheel angle rate value is a function of said hand wheel angle value.

4. The method of controlling a magneto-rheological power steering coupling of claim 2, wherein said generating a pump speed command value includes:
   determining if a brake pedal is depressed from said brake pedal state value;
   if said brake pedal is depressed, comparing said pump speed command value to a predetermined speed constant; and
   if said pump speed command value is less than said predetermined speed constant, equating said pump speed command value to said predetermined speed constant.

5. The method of controlling a magneto-rheological power steering coupling of claim 2, wherein said generating a pump speed command value includes:
   comparing said pump speed command value to said engine speed value multiplied by a pulley ratio value; and
   if said pump speed command value is greater than said engine speed value multiplied by said pulley ratio value, equating said pump speed command value to said engine speed value multiplied by said pulley ratio value with a pump speed offset value subtracted therefrom.

6. The method of controlling a magneto-rheological power steering coupling of claim 1, wherein said computing a hand wheel angle rate value includes applying a low pass filter with a cut-off frequency to said hand wheel angle rate value.

7. The method of controlling a magneto-rheological power steering coupling of claim 2, wherein said determining a pump speed error value includes subtracting said pump speed value from said pump speed command value.

8. The method of controlling a magneto-rheological power steering coupling of claim 1, wherein said computing a duty cycle value includes equating said duty cycle value equal to a predetermined minimum duty cycle value if said duty cycle value is less than or equal to zero percent.

9. The method of controlling a magneto-rheological power steering coupling of claim 1, wherein said computing a duty cycle value includes equating said duty cycle value to a predetermined maximum duty cycle value if said pulse width modulation duty cycle value is greater than or equal to one hundred percent.

10. The method of controlling a magneto-rheological power steering coupling of claim 1, wherein said computing a duty cycle value includes limiting said duty cycle value equal to a calibrated duty cycle value if said hand wheel angle value is greater than a predetermined maximum hand wheel angle value.

11. The method of controlling a magneto-rheological power steering coupling of claim 2, wherein said computing a duty cycle value includes reducing said duty cycle value, when said coil temperature value is greater than or equal to a predetermined limit coil temperature value, according to the equation $$Dp = Dp * \frac{(Tc\_max - Tc)}{(Tc\_max - Tc\_lim)}$$

where: Dp is said pulse width modulation duty cycle value; Tc is said coil temperature value; Tc_max is a maximum allowable coil temperature value; and Tc_lim is said limit coil temperature value.

* * * * *